United States Patent Office 3,671,345
Patented June 20, 1972

3,671,345
POROMERIC MATERIAL HAVING A PATENT LEATHER-TYPE FINISH AND PROCESS FOR MAKING
Jon F. Barnes and James L. Johnson, Akron, Ohio, assignors to The General Tire & Rubber Company
No Drawing. Filed Dec. 11, 1969, Ser. No. 884,328
Int. Cl. B32b 5/18
U.S. Cl. 156—77         16 Claims

ABSTRACT OF THE DISCLOSURE

A process of making a poromeric material with a patent leather-type finish comprising the steps of casting a layer of phase-invertable polymer solution, comprising an extended urethane polymer, a polyvinyl chloride resin, and a water miscible solvent, onto a releasable substrate, placing the layer in a steam atmosphere to phase-invert the solution and to produce a poromeric material with a patent leather-type finish on the side of the material adjacent the releasable substrate, drying and removing the poromeric material from the releasable substrate. This invention also includes the products made by this process.

BACKGROUND OF THE INVENTION

Field of the invention

This invention relates to the field of poromeric materials. More particularly, this invention relates to poromeric materials having special finishes and to methods of making such materials with patent leather-type finishes.

Description of the prior art

"Patent" leather is the term used in the leather industry to define a glossy finished leather. The glossy finish is made by applying varnish, varnish-like materials, and oils, especially vegetable oils, to the leather surface. The high gloss and smooth finish lends itself to wide utilization in various apparel styling fashions, such as in shoes, purses, and parts of hats, coats, and gloves. Recently, the term "patent" leather has been applied to other glossy finished materials such as various synthetic leather products and plastic sheet material.

Patent leather and materials with patent leather-type finishes have a number of disadvantages. For instance, they do not pass water vapor or moisture and when used as a shoe material, they make a very hot-wearing shoe. In addition, the moisture trapped in the shoe or other apparel promotes uncomfortableness and accelerates the aging and cracking of the material. Furthermore, natural leather based patent leather suffers the added problems indigenous to all leather goods, such as that samples vary as to thickness and hand and that lengths and widths are restricted.

This invention is the discovery of a process of making a patent leather-type finished polymeric material that is poromeric i.e., passes water vapor. The finish exhibits the characteristic high gloss of patent leather, yet the material readily passes moisture to provide comfort to the user. In addition, this inventive process produces poromeric patent leather-type materials of a wide range of thicknesses, strengths, colors, and other physical properties to provide a wide variety of end products.

Therefore, the main object of this invention is a process of making a poromeric material with a patent leather-type finish and to the materials made from this process. Other objects include a method of making relatively low cost sheet materials for use in the apparel industry; a process of producing materials of uniform thicknesses and high moisture vapor transmission rates; a process of making poromeric patent leather-type materials for use in making cool-wearing shoes that do not crack or rapidly age; and materials that may be manufactured in various colors, lengths, widths, and thicknesses.

SUMMARY OF THE INVENTION

This invention concerns a process of making a poromeric material with a patent leather-type finish comprising the steps of casting a layer of a phase-invertable polymer solution onto a releasable substrate, placing the layer in a steam atmosphere to phase-invert the solution and produce a poromeric material with a patent leather-type finish on the side of the material adjacent the releasable substrate, drying the poromeric material and removing it from the releasable substrate.

DESCRIPTION OF THE PREFERRED EMBODIMENT

The main ingredient used in the process of this invention, to produce a poromeric material with a patent leather-type finish, is a solution of a chain extended urethane polymer and a polyvinyl chloride resin in a water miscible solvent, known in the plastics trade as a "phase-invertable" polymer solution. The polymers are blends of a polyester or polyether urethane, which is the reaction product of a polymeric polyester or polyether and a polyisocyanate and chain extended with a substituted organic amine, and a homopolymer of vinyl chloride. The solvent is a water miscible liquid such as dimethyl formamide or tetrahydrofuran. The solution is termed "phase-invertable" because, when cast in a layer and subjected to a liquid that is miscible with the solvent but a non-solvent for the polymers, the polymers are said to "phase-invert" or coagulate into a solid matrix containing many small interconnected openings or pores through which moisture may pass thus giving the generic name "poromeric" to the dried product.

Phase-invertable polymer solutions of the type just described are commercially available; an example is a Phase-Invertable Polymer Solution STF–160 made by Reichhold Chemical Industries and is a polyester urethane based polymer of an average molecular weight of 20,000 and is about 35% solids.

The first step in the process of this invention is to cast a layer of the above described solution onto a releasable substrate. This may be done in any number of ways such as blade-coating, brushing, using a draw bar, and extruding the layer. The general requirement is that a smooth layer of even gauge be deposited on the substrate. The gauge or thickness of the liquid coat is termed the "wet gauge"; the gauge of the dried coat is less and is termed the "dry gauge." This casting step is easily accomplished in a continuous process where a conveyor belt having a facing of a releasable substrate, is positioned under a doctor blade to accept a layer of polymer solution for transfer to the next process step.

The thickness or wet gauge of the cast layer of solution is determined in part by the desired final thickness or dry gauge and in part by the concentration of polymer in the solution. For a change in the desired dry gauge of the material one may either alter the concentration of the solution or the thickness (wet gauge) of the coating; this latter variable is many times the more easily accomplished, especially in a continuous process. Patent leather-type finished materials, made by this inventive process have been made as thin as .0025 inches (2.5 mils) dry gauge to as thick as 23 mils; the only apparent limits are loss of moisture vapor transmission rate (MVTR) and tensile strength when produced too thick.

The method of casting the layer determines the usable viscosity range of the polymer solution. For blade coating or extruding the layer, the viscosity should range between about 10,000 to 75,000 centipoise with the optimum range being between 20,000 to 30,000 centipoise. As these two methods of casting are the most widely used, further consideration of viscosity is not warranted except to say that the viscosity of the solution may be adjusted to almost any desired value by heating or cooling, i.e., a high viscosity solution may be substantially thinned by gently heating it conversely, a low viscosity solution may be substantially thickened by cooling it.

The releasable substrates usable in this invention comprehend virtually any smooth surface. There are many types of releasable substrates known in the art such as chrome-ferro plates, polished steel surfaces, glass plates, and polytetrafluoroethylene surfaces. Of these, substrates known as Transkote Patent AV, manufactured by S. D. Warren Company, are preferred for their good release and reusability. In addition, the releasable substrate may be embossed or have other like impressed designs that will transfer to the patent leather-type finish.

The next step in the process is to place the cast layer in a steam atmosphere to phase-invert the solution and to form a poromeric material. In this steam atmosphere, the water vapor combines with the water miscible solvent and the two exit the layer leaving behind a solid material. As is well-known in the art, this procedure produces a polymer matrix containing many very small interconnected openings or pores which serve later to pass water vapor across the material.

Although not fully understood, the phase-inversion step in this process must be accomplished in a steam atmosphere, i.e., wherein either superheated or saturated steam is introduced into the environment of the cast layer. If not accomplished in this manner, either the color or the patent leather-type gloss will not fully develope in the material. Because of condensation of the steam onto the layer of cast material, the temperature at the layer surface will be less than the steam atmosphere temperature. The layer surface temperature may be controlled by varying the steam imput rate. The operable range of layer surface temperature is between about 120° F. to about 210° F. with the preferred range between about 140° F. to about 180° F. The dwell time, or time the layer is exposed to this atmosphere, varies inversely with the temperature, i.e., longer dwell time is required at lower temperature than at higher temperature. For example, a 15–30 mil wet gauge of phase-invertable polymeric solution will require between 5–15 minutes at 140° F. to fully phase-invert whereas a 50–60 mil wet gauge layer will require 25–30 minutes at 140° F. or 15–25 minutes at 170° F. The optimum limits of the time-temperature relationship in this step are mainly governed by a subjective determination of the color and gloss of the patent leather-type finish produced; for a higher gloss one may choose to increase or decrease the dwell time, increase or decrease the environmental temperature, etc.

Another aspect of this step is the addition of other constituents to the steam atmosphere to affect the phase-inversion of the polymeric solution. Under some circumstances, such as in the use of highly volatile polymer solution solvents, it may be desirable to change the rate of phase-inversion of the polymer solution to achieve a change in MVTR, a higher gloss, etc. yet retain a high surface temperature to keep the polymers flexible. This change may be accomplished by introducing into the environment other vapors such as methanol, ethanol, air, etc. that change the rate of phase inversion by enhancing or inhibiting the ability of the water molecules to migrate to the layer surface and combine with the polymer solution solvent.

During the phase-inversion of the polymer solution and the production of the poromeric structure, the polymer adjacent the releasable substrate is formed into a poromeric structure on a very small scale. The pores are so small that they cannot be seen with the unaided eye. It is not known exactly how the high gloss finish developes during this phase-inversion. It is theorized that the thickness of the cast layer in conjunction with the impervious releasable substrate prevents large openings from developing in the surface, during the steam created phase-inversion, thus creating a high gloss poromeric finish.

The next step in the process of this invention is to dry the layer. By "drying" is meant to remove all or virtually all of the vaporizable components; these comprise residual solvent from the solution and water and other constituents from the steam atmosphere. As in the case of the phase-inversion step, this step also has a time-temperature relationhip, that is, the layer may be dried at a lower temperature by allowing it to remain for a longer time period or be dried in a shorter time at a higher temperature. Care must be taken to insure that the temperature of this drying step does not exceed the distortion temperature or degradation temperature of the polymeric components of the coating viz. the polyvinyl chloride resin. During this drying step the polymer structure becomes tougher and more firm due to the loss of the plasticizing nature of the vaporizable components.

The next step in the process is to remove the material from the releasable substrate. This is a relatively easy, straight forward step, however, caution must be exercised to insure that the removal force is maintained at less than the ultimate tear or distortion strength of the material so that the material is not permanently distorted; preferably the material is cooled before removing from the substrate. Another meritorious feature of this invention is that the releasable substrate may contain embossing such as decorative designs, trademarks, etc., which will transfer to the cast layer of solution and produce a high fidelity mirror image on the patent leather surface of the finished material.

It should be noted that these latter two steps, i.e., drying and removing, may be interchanged without effect on the finished material. For instance, it may be desirable, in a continuous process, to remove the phase-inverted material from the releasable substrate and dry it in separate equipment so that the releasable substrate can be returned for recasting of more polymer solution. Generally, after phase inversion, the film is of sufficient strength to be self-supporting or, at least, amenable to support by another carrier such as a chain belt carrier.

A separate embodiment of the process of this invention is a modification wherein the step of placing the cast layer in a steam atmosphere, to phase-invert the polymer solution and to form a poromeric material, includes the subsequent step of soaking the layer in a water bath or in a bath comprising a major amount of water. This additional step insures a more complete removal of the water miscible solvent from the film and produces a tougher material. In addition to water, the bath may contain other constituents such as residual water miscible solvent, other extractable solvents from the wet layer and other liquids such as methyl alcohol and acetone. As in the phase-inversion and drying steps, there is a time-temperature relationship in this step. That is, the soaking may be carried to a determinable degree by allowing the layer to remain in the bath at a low temperature for a longer time or a high temperature for a shorter time. This step is optional in the process of this invention, however, it is preferably included to insure a more complete removal of solvent.

Still another embodiment of this invention is to adhere a layer of fabric or flexible polymeric foam to the exposed surface of the dried material to form a laminate; these laminates are known as "supported" films in the trade parlance. Virtually any type of fabric, i.e., woven, nonwoven, or knitted may be utilized in this embodiment. Moreover, both natural and synthetic fabrics may be used as well as strong, polymeric foams such as polyurethane foam. The most conventional method of adhering the fabric or foam to the dry material is by the use of adhesives; these materials are well-known in the art and are commercially available. The advantages of laminating a fabric onto the back of the patent leather-type finished material of this invention is that the tear strength and tensile strength of the laminate is immediately increased to at least that of the fabric. This permits the supported patent leather-type finished material to be used in a wider range of applications. In addition, a thin layer of polymeric foam reactants may be cast over the material, on the side opposite the patent leather-type finish, so that the developing foam will form a layer and adhere to said material.

A further embodiment of the process of the invention is a modification to the step of casting onto a releasable substrate a layer of the phase-invertable polymer solution wherein this step includes the subsequent step of pressing a layer of fabric or foam over the exposed surface of the wet cast layer prior to placing the layer in the steam atmosphere. The same types of fabrics and foams disclosed in the preceding embodiment may also be used in this embodiment. As the fabric is pressed into the wet cast layer, some of the polymeric solution may rise through the threads or fibers and interlock the fabric to the layer; in the case of the foam, the wet layer rises into the cells adjacent the wet layer surface and performs the same interlocking action. During phase inversion, the polymer forms a strong network on one side of the fabric or on one side of the foam and securely anchors the fabric or foam to the material. An advantage of this embodiment is the elimination of adhesives in making the laminate. Care must be taken to insure that the fabric is not pressed so deeply into the layer that its weave pattern shows through the patent leather-type finish; this is known in trade parlance as "strike-through." Strike-through may be prevented by casting a slightly thicker polymer solution layer and keeping the pressure of pressing the fabric very low or at a minimum sufficient to anchor the fabric.

A still further embodiment of this invention is a modification to the process wherein there is cast onto the releasable substrate a first thin layer of a solution of a hard wearing polymer; this first thin layer is then dried (not phase-inverted) to form a layer of dried material. Then cast onto this first layer of dried material is a second thicker layer of a phase-invertable polymer solution. Thereafter, the two layers are placed in a steam atmosphere to phase-invert the second layer and produce a poromeric material. The layers are then dried and stripped from the releasable substrate, or vice versa. The first thin layer of dried polymer forms a tough, abrasive resistant top coating over the poromeric patent leather-finished material to provide a longer lasting, more durable, scuff resistant surface. Surprisingly, this top coat does not grossly impair the moisture vapor transmission properties of the base material. Furthermore, the two layers may be made of different colors to provide more stylish decoration or the top coat may be clear; some examples of these top coating polymers are clear and pigmented urethane polymer solutions which are commercially available.

This latter embodiment may also be used in conjunction with the aforesaid embodiments of soaking the phase-inverted polymer in water, adhering a layer of fabric or foam to the dried material to form a laminate, and/or pressing a layer of fabric onto the surface of the wet cast second layer. The first layer of cast polymer should be noticeably thinner than the second layer to prevent the first layer from greatly deteriorating the moisture vapor transmission rate of the material.

The products of this invention are poromeric materials having patent leather-type finishes. By poromeric is meant that the moisture vapor transmission rate (MVTR) is between about 2500 to about 9000 grams of water/100 meter$^2$/hour across a relative humidity differential. In addition, the materials produced by the process of this invention display good physical properties to enable them to be used in a wide variety of applications. For instance, by utilizing the tough top coat of this invention, a poromeric material having a patent leather-type finish of high abrasion resistance will be produced that is desirable in the shoe and purse industry. In addition, the materials produced by the basic process display a high tear resistance and are more flexible which is desirable for materials used in the coat and glove industry. In addition, higher tear resistance may be gained by increasing the thickness of the cast layers or using a stronger laminating fabric. Further, surface hardness and tensile strength may be varied by changing the ratio of urethane polymer to polyvinyl chloride resin in the polymeric solution. It is easy to see by the large number of process variables of this invention that a wide choice of physical properties and styles are possible. In addition, the materials in this invention may be made in various widths, colors, and surface styling such as embossing. Finally, the high moisture vapor transmission rates permits them to be used as shoe material without the aforesaid disadvantages such as uncomfortableness to the wearer and moisture-accelerated deterioration. The materials of this invention are easily produced by automatical processing and thus are relatively low cost.

Following are examples which are set forth to show one skilled in the art how to practice the invention, the efficacy of the process, the wide variety of process variables, and the large number of patent leather finished products that may be produced thereby. These examples are not to be construed either singly or in combination as placing a limitation on the invention. The moisture vapor transmission rates (MVTR) were determined in this invention (and examples) by the use of a Honeywell Model W825 Water Vapor Transmission Rate Tester, manufactured by Honeywell, Inc. Apparatus Controls Division, Sensor Products, 2701 Fourth Avenue South, Minneapolis, Minn. The results of these tests may be readily duplicated by other MVTR tests such as that described under ASTM Standard E96–53T. In the following examples, all percentages are percent by weight and all parts are parts by weight per 100 parts polymer unless otherwise noted.

EXAMPLE 1

Two, phase-invertable polymer solutions were prepared according to formulations A and B listed below:

| Ingredients | Formula A | Formula B |
| --- | --- | --- |
| Tetrahydrofuran | 461.0 | |
| Dimethyl formamide | | 461.0 |
| Polyvinyl chloride resin (IV=0.95) | 25.0 | 25.0 |
| Carbon black | 4.0 | 4.0 |
| Water | 5.0 | 5.0 |
| Polybutylene adipate | 70.0 | 70.0 |
| Diphenylmethane-4,4 diisocyanate | 30.0 | 30.0 |
| Propane diamine | (*) | (*) |

* Added in amounts necessary to achieve desired viscosity of the solution by chain extending the polyurethane produced by the reaction between the polybutylene adipate and the diphenylmethane, 4-4-diisocyanate.

The solutions were prepared by ball milling part of the solvent, polyvinyl chloride resin, and the carbon black into a slurry, separately reacting the polybutylene adipate and diphenylmethane-4,4 diisocyanate to form a urethane, combining the slurry and urethane together with the balance of the solvent, polyvinyl chloride resin, and the water, and then adding propene diamine to chain extend the urethane until the desired viscosity (between about 10,000 to about 75,000 cp.) was obtained.

Each solution was cast onto a releasable substrate (Transkote Patent AV Release Paper, S. D. Warren Company) in a 30 mil wet gauge layer, placed in a closed steam cabinet (layer surface temperature about 140° F.) in a steam environment for 5 minutes (Formula A) and 15 minutes (Formula B) respectively, then dried in a 250° F. forced air oven for 10 minutes, and then removed from the substrate. The physical properties of the poromeric materials having poromeric leather-type finishes are listed below in Table 1:

TABLE 1

| | Formula A | Formula B |
|---|---|---|
| Wet gauge (mil) | 15 | 15 |
| Dry gauge (mil) | 2.5 | 2.5 |
| Density gm./cm.$^3$ | 0.70 | 0.66 |
| Ultimate tensile strength (p.s.i.) | 1,800 | 1,830 |
| Ultimate elongation (percent) | 200 | 220 |
| 100% modulus (p.s.i.) | 800 | 1,016 |
| Graves tear (p.s.i.) | | 189 |
| MVTR (gm. H$_2$O/100 m.$^2$/r) | 1,500 | 3,700 |
| Micro hardness | | 95 |
| Area shrinkage | 8.0 | 5.4 |
| Color | Black | Black |
| Finish | (¹) | (¹) |

¹ High gloss.

This example shows that the process of this invention will produce a poromeric material with a patent leather finish. This example also shows that tetrahydrofuran and dimethyl formamide may be used as water miscible solvents for these phase-invertable polymer solutions.

EXAMPLE 2

Solutions corresponding to Formulations A and B of Example 1 were prepared in different viscosities by varying the amount of propene diamine added to the solution and then cast on layers, phase-inverted, dried, and stripped as described in that example. Each sample of finished material was then observed as to whether or not it formed a patent leather-type finish. The results of these observations are listed below in Table 2; it should be noted that these observations were made on a subjective scale as there are no known means of objectively measuring the "patent-leather-ness" of a finish.

TABLE 2

| | Viscosity (cps.) | Presence of patent leather-type finish |
|---|---|---|
| Formula A | 15,000 | Yes. |
| Formula B | 20,000 | Yes. |
| Do | 25,000 | Yes. |
| Do | 30,000 | Yes. |
| Do | 40,000 | Yes. |
| Do | >75,000 | No. |

This example shows part of the usable range of phase-invertable polymer solution viscosities and further shows that polymer solution viscosities greater than about 75,000 cps. are generally inoperative in the process of this invention.

EXAMPLE 3

A phase-invertable polymer solution, corresponding to Formula B in Example 1, was prepared and samples processed as described in that example except that the temperature and dwell time in the phase inversion step were varied. The poromeric materials produced were then tested for MVTR and observed as to color and finish; these results appear below in Table 3.

TABLE 3

| Layer surface temperature, °F. | Phase inversion dwell time, min. | MVTR (gm./100 m.²) | Color | Finish |
|---|---|---|---|---|
| 98 | 5 | 10,000+ | Gray | Glossy. |
| 120 | 5 | 8,300 | Dark gray | Do. |
| 140 | 5 | 7,300 | Black | Do. |
| 160 | 5 | 4,600 | do | High gloss. |
| 180 | 5 | 4,400 | do | Glossy. |
| 208 | 20 | 3,700 | do | Do. |
| 140 | 5 | 7,300 | Dark gray | Shiny. |
| 140 | 10 | 4,900 | Black | Do. |
| 140 | 15 | 5,900 | do | Glossy. |
| 140 | 20 | 5,000 | do | Do. |
| 140 | 25 | 5,100 | do | High gloss. |
| 140 | 30 | 5,800 | do | Do. |
| 180 | 5 | 4,400 | do | Glossy. |
| 180 | 10 | 4,100 | do | Do. |
| 180 | 15 | 4,600 | do | High gloss. |
| 180 | 20 | 5,100 | do | Do. |
| 180 | 25 | 4,600 | do | Do. |
| 180 | 30 | 4,900 | do | Do. |

This example shows that the poromeric structure, color, and finish of the patent leather-type finished material, produced by the process of this invention is affected by the temperature and dwell time of the phase inversion step. This example also shows that the highest gloss finish is produced at phase-inversion temperatures between about 140° F. to about 180° F.

EXAMPLE 4

A phase-invertable polymer solution, corresponding to Formula B in Example 1, was prepared and samples processed as described in that example except that the wet gauge was varied from 10 mils to 100 mils. The poromeric materials produced were then tested for MVTR and other physical properties; these results appear below in Table 4.

TABLE 4

| Wet gauge (mils): | Dry gauge (mils) |
|---|---|
| 10 | 2.5 |
| 15 | 5 |
| 30 | 8 |
| 45 | 12 |
| 60 | 23 |
| 75 | |
| 80 | } Ran off carrier before |
| 100 | } phase-inverting. |

| | | | | | |
|---|---|---|---|---|---|
| Dry gauge (mils) | 2.5 | 4 | 8 | 12 | 23 |
| Tensile strength (p.s.i.) | 2,290 | 1,843 | 2,118 | 1,423 | 746 |
| Elongation (percent) | 244 | 220 | 315 | 196 | 137 |
| Graves tear | 184 | 189 | 166 | 130 | 87 |
| MVTR gm./100 m.²/hr | 7,641 | 3,900 | 3,500 | 2,767 | 3,830 |

This example shows the wide range of thicknesses that may be produced in the materials of this invention.

EXAMPLE 5

A phase-invertable polymer solution, corresponding to Formula B in Example 1, was prepared and samples processed as described in that example except that in one sample the steam environment in the steam cabinet contained approximately 20 volume percent methyl alcohol vapors. Physical properties of a sample prepared without methyl alcohol and that prepared with methyl alcohol were determined and these are listed below in Table 5.

TABLE 5

| | With MeOH vapors | Without MeOH vapors |
|---|---|---|
| Dry gauge (mils) | 4 | 4 |
| Tensile strength (p.s.i.) | 2,178 | 1,830 |
| Elongation (percent) | 244 | 220 |
| MVTR gm./100 m.²/hr | 4,532 | 3,900 |

This example shows that some of the steam atmosphere may be replaced with other vapors to affect the poromeric material produced.

EXAMPLE 6

A phase-invertable polymer solution, corresponding to Formula B in Example 1, was prepared and samples processed as described in that example except that the drying temperature was varied while the dwell time in the drying was held at 5 minutes. Each sample was tested for physical properties and these appear below in Table 6.

TABLE 6

| Drying temperature (° F.) | 200 | 250 | 300 | 350 |
|---|---|---|---|---|
| Dry gauge (mil) | 2.5 | 2.5 | 2.5 | 2.5 |
| Tensile strength (p.s.i.) | 2,290 | 3,955 | 4,020 | 3,011 |
| Elongation (percent) | 244 | 254 | 263 | 248 |
| Graves tear | 184 | 359 | 317 | 435 |
| MVTR gm./100 m.²/hr | 7,641 | 2,963 | 6,332 | 3,188 |

EXAMPLE 7

A phase-invertable polymer solution, corresponding to Formula B in Example 1, was prepared and processed as described in that example and then laminated with different fabrics into supported films. The lamination was accomplished by applying a layer of acrylic-based adhesive latex (Rohn & Haas E-485) to the non-glossy side of the layer and then pressing samples of fabrics thereto. Below in Table 7 are listed some of the supported films made by this embodiment of the process of this invention.

TABLE 7

| Fabric | Adhesive | Product | | |
|---|---|---|---|---|
| | | Tensile strength, pounds to break | Elongation, percent | MVTR, gm./100 m.²/hr. |
| Napped woven cotton | E-485 [1] | 77 | 11 | 3,550 |
| Polyester non woven (65 mil) | E-485 [1] | 59 | 112 | 2,061 |
| Polyester non woven (35 mil) | E-485 [1] | 51 | 57 | 2,452 |
| Flocked nylon knit | E-485 [1] | 34 | 63 | 1,384 |

[1] Acrylic Latex, Rohm & Haas Chemical Co.

EXAMPLE 8

A phase-invertable polymer solution, corresponding to Formula B in Example 1, was prepared and processed as described in that example except that, after the polymer solution was cast onto the releasable substrate, a layer of fabric was pressed onto the exposed surface of the wet layer so that the solution rose up through some of the threads in the fabric; in the case of the foam, a thin layer of flexible polyurethane foam was pressed onto the wet layer of polymeric solution. The finished product, when removed from the releasable substrate, was a supported poromeric film having a patent leather-type finish and without the inclusion or use of a separate adhesive. Below in Table 8 are listed some of the supported films made by this embodiment of the novel process of this invention:

TABLE 8

| Fabric | Product |
|---|---|
| 100% nylon tricot knit | Strong, patent leather finished material. |
| Flexible polyurethane foam | Do. |
| Napped cotton weave | Do. |

This example shows that a fabric or a foam may be laminated to the wet cast layer of phase-invertable polymer solution prior to the phase inversion step to produce supported films without the necessity of adhesive.

EXAMPLE 9

A phase-invertable polymer solution, corresponding to Formula B in Example 1, was prepared as described in that example. Two samples of poromeric patent leather-finished material were prepared by the process described in Example 1 except that in the case of one sample a 5.0 mil layer of urethane-based top coat solution was first cast onto the releasable substrate and oven dried, to yield a 0.5 mil layer of dried material. A second 15 mil wet layer (4 mils dry gauge) of phase-invertable polymer solution was then cast on top of the layer of dried material and processed as described in Example 1. The physical properties of the two samples are listed below in Table 9:

TABLE 9

| | Top coated material | Non-top coat material |
|---|---|---|
| Poromeric film thickness (dry gauge), mil | 4.1 | 4.0 |
| Top coat film thickness (dry gauge), mil | 0.4 | |
| MVTR gm./100 m.²/m | 2,319 | 3,900 |
| Tensile strength (p.s.i.) | 3,318 | 2,000 |
| Elongation at break (percent) | 333 | 220 |
| Graves tear (p.s.i.) | 167 | 189 |

This example shows the enhanced abrasion resistance offered by the top coating embodiment of this invention and also shows the small reduction in MVTR occasioned by the use of a thin top coat.

EXAMPLE 10

A phase invertable polymer solution, corresponding to Formula B in Example 1, was prepared as described in that example. A 30 mil layer of said solution was cast onto a releasable substrate. Below, in Table 10, are listed a series of steps to which samples of these cast layers were subjected along with observations as to their finishes.

TABLE 10

| Sample | Process | Finish |
|---|---|---|
| 1 | 10 minutes soak in 70/30 dimethyl formamide/water. 40 minutes soak in water. 10 minutes drying in 250° F. forced air oven. | Dull, light gray. |
| 2 | 10 minutes in 98% relative humidity at 104° F. 10 minutes soak in 70/39 dimethyl formamide/water. 40 minutes soak in water. 10 minutes drying in 250° F. forced air oven. | Dull, light gray. |
| 3 | 2 minutes in 98% relative humidity at 104° F. 10 minutes soak in 70/30 methyl alcohol/water. 40 minutes soak in water. 10 minutes drying in 250° F. forced air oven. | Dull, light gray. |
| 4 | 10 minutes soak in 70/30 methyl alcohol/water. 40 minutes soak in water. 10 minutes drying in 250° F. forced air oven. | Dull, gray. |
| 5 | 15 minutes in steam atomosphere at 140° F.—layer surface temperature. 10 minutes drying in 250° F. forced air oven. | Black, glossy. |
| 6 | 15 minutes in steam atmosphere at 140° F.—layer surface temperature. 20 minutes soak in water. 10 minutes drying in 250° F. forced air oven. | Black, glossy. |

This example demonstrates the novelty of this process in producing a patent leather-type finish on phase-invertable polymeric material wherein other steps, known in the poromeric material, phase invertable art do not produce the same material as produced by subjecting the cast layer to a steam atmosphere.

What is claimed is:

1. A process of making a poromeric material with a patent leather-type finish comprising the steps of:
   (a) casting a layer of a phase-invertable polymer solution, comprising an extended urethane polymer, a polyvinyl chloride resin, and a water miscible solvent onto a releasable substrate;
   (b) placing said layer in a steam atmosphere to phase-invert said solution and to produce a poromeric material with a patent leather-type finish on the side of said material adjacent said releasable substrate;
   (c) drying said poromeric material, and;
   (d) removing said poromeric material from said releasable substrate.

2. The process of claim 1 including the additional step of soaking said material in a liquid, comprising a major amount of water, to increase the removal of said water miscible solvent from said material subsequent to step (b).

3. The process of claim 1 including the additional step of adhering a layer of fabric to the exposed surface of said material to form a laminate subsequent to step (c).

4. The process of claim 2 including the additional step of adhering a layer of fabric to the exposed surface of said material to form a laminate subsequent to step (c).

5. The process of claim 1 including the additional step of pressing a layer of fabric onto the exposed surface of said layer to form a laminate subsequent to step (a).

6. The process of claim 1 including the subsequent step of pressing a layer of foam onto the exposed surface of said layer to form a laminate subsequent to step (a).

7. The process of claim 2 including the additional step of pressing a layer of fabric onto the exposed surface of said layer to form a laminate subsequent to step (a).

8. The process of claim 2 including the additional step of pressing a layer of foam onto the exposed surface of said layer to form a laminate subsequent to step (a).

9. A process of making a poromeric material with a patent leather-type finish comprising the steps of:
   (a) casting a first, thin layer of a hard wearing polymer solution onto a releasable substrate;

(b) drying said layer to form a first layer of dried material;

(c) casting a second, thicker layer of a phase-invertable polymer solution, comprising an extended urethane, a polyvinyl chloride resin and a water miscible solvent, onto said first layer of dried material wherein said second layer adheres tightly to said first layer;

(d) placing said first and second layers in a steam atmosphere to phase-invert said solution and produce a poromeric material with a patent leather finish on the side of said material adjacent said first layer of dried material;

(e) drying said first and second layers; and, (f) removing said layers from said releasable substrate.

10. The process of claim 9 including the additional step of pressing a layer of fabric onto the exposed surface of said second layer to form a laminater subsequent to step (c).

11. The process of claim 9 including the additional step of pressing a layer of foam onto the exposed surface of said second layer to form a laminate subsequent to step (c).

12. The process of claim 9 including the additional step of soaking said layers in a liquid, comprising a major amount of water, to increase the removal of said water miscible solvent from said second layer subsequent to step (d).

13. The process of claim 9 including the additional step of adhering a layer of fabric to the exposed surface of said second layer of poromeric material to form a laminate subsequent to step (c).

14. The process of claim 12 including the additional step of adhering a layer of fabric to the exposed surface of said second layer of poromeric material to form a laminate subsequent to step (e).

15. A process of making a poromeric material with a patent leather-type finish comprising the steps of:
(a) casting a layer of a phase-invertable polymer solution, comprising an extended urethane polymer, a polyvinyl chloride resin, and a water miscible solvent onto a releasable substrate;
(b) placing said layer in a steam atmosphere to phase-invert said solution and to produce a poromeric material with a patent leather-type finish on the side of said material adjacent said releasable substrate;
(c) removing said poromeric material from said releasable substrate; and,
(d drying said poromeric material.

16. A process of making a poromeric material with a patent leather-type finish comprising the steps of:
(a) casting a first, thin layer of a hard wearing polymer solution onto a releasable substrate,
(b) drying said layer to form a first layer of dried material;
(c) casting a second, thicker layer of a phase-invertable polymer solution, comprising an extended urethane, a polyvinyl chloride resin and a water miscible solvent, onto said first layer of dried material wherein said second layer adheres tightly to said first layer;
(d) placing said first and second layers in a steam atmosphere to phase-invert said solution and produce a poromeric material with a patent leather finish on the side of said material adjacent said first layer of dried material;
(e) removing said layers from said releasable substrate; and,
(f) drying said first and second layers.

References Cited

UNITED STATES PATENTS

| | | | |
|---|---|---|---|
| 3,516,883 | 6/1970 | Harper | 156—77 |
| 3,123,508 | 3/1964 | Waugh | 156—79 |
| 3,497,072 | 2/1970 | Cannon | 161—159 |
| 3,284,274 | 11/1966 | Hulslander et al. | 156—77 |
| 3,418,198 | 12/1968 | Einstman | 156—77 |
| 3,524,791 | 8/1970 | Bethman et al. | 161—159 |
| 3,536,572 | 10/1970 | Murphy et al. | 161—159 |

CARL D. QUARFORTH, Primary Examiner

S. R. HELLMAN, Assistant Examiner

U.S. Cl. X.R.

156—79, 246, 289; 161—159